(12) United States Patent
Heron et al.

(10) Patent No.: US 8,244,878 B2
(45) Date of Patent: Aug. 14, 2012

(54) USER EXPERIENCE FOR MULTIPLE SIMULTANEOUS CONNECTIONS ON AN INSTANT MESSAGING PROGRAM

(75) Inventors: Alexandra K Heron, Kirkland, WA (US); John S Holmes, Seattle, WA (US); Nicole D Steinbok, Redmond, WA (US); Michael A Smuga, Seattle, WA (US); Geeven Singh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 11/762,614

(22) Filed: Jun. 13, 2007

(65) Prior Publication Data

US 2008/0313297 A1 Dec. 18, 2008

(51) Int. Cl.
*G06F 15/173* (2006.01)
(52) U.S. Cl. ......... 709/227; 709/204; 709/206; 709/207
(58) Field of Classification Search .......... 709/206–207, 709/227
See application file for complete search history.

(56) References Cited

U.S. PATENT DOCUMENTS

| | | |
|---|---|---|
| 5,128,981 A | 7/1992 | Tsukamoto et al. |
| 5,221,838 A | 6/1993 | Gutman et al. |
| 5,333,266 A | 7/1994 | Boaz et al. |
| 5,493,692 A | 2/1996 | Theimer et al. |
| 5,754,119 A | 5/1998 | Deluca et al. |
| 5,812,784 A | 9/1998 | Watson et al. |
| 6,654,790 B2 | 11/2003 | Ogle et al. |
| 6,768,790 B1 | 7/2004 | Manduley et al. |
| 6,788,949 B1 | 9/2004 | Bansal |
| 6,920,478 B2 | 7/2005 | Mendiola et al. |
| 6,981,223 B2 | 12/2005 | Becker et al. |
| 6,983,370 B2 | 1/2006 | Eaton et al. |
| 7,124,123 B1 | 10/2006 | Roskind et al. |
| 7,590,696 B1 * | 9/2009 | Odell et al. ............... 709/206 |
| 2002/0160794 A1 | 10/2002 | Tisserand et al. |
| 2003/0023691 A1 | 1/2003 | Knauerhase |
| 2004/0246121 A1 * | 12/2004 | Beyda ........................ 340/506 |
| 2005/0102365 A1 | 5/2005 | Moore et al. |
| 2005/0111653 A1 * | 5/2005 | Joyce et al. ............. 379/265.09 |

OTHER PUBLICATIONS

Godefroid, et al., "Ensuring Privacy in Presence Awareness Systems: An Automated Verification Approach", available at least as early as Apr. 12, 2007, at <<http://cocasoft.csdl.tamu.edu/~lidu/papers/cscw2k.pdf, pp. 59-68.
Kurikka, et al., "Empirical Aspects on Implementing Application Supernetworking", available at least as early as Apr. 12, 2007, at <<http://www.mediateam.oulu.fi/publications/pdf/549.pdf>>, pp. 1-5.

(Continued)

*Primary Examiner* — Yves Dalencourt
(74) *Attorney, Agent, or Firm* — Lee & Hayes, PLLC

(57) ABSTRACT

Methods, computer-readable storage media, and systems for establishing multiple simultaneous connections on an instant messaging program to enhance the user experience. The user receives notifications of request to communicate, an email, or an alert on communication devices. By choosing which communication device to respond on, that particular communication device becomes active, continuing the communication to transmit to and receive from on that communication device. The process also includes mirroring the communication on the other communication devices that are alive (connected) and non-mobile. Furthermore, the other communication devices are kept alive to allow the user to switch from one communication device to another during communication.

18 Claims, 10 Drawing Sheets

OTHER PUBLICATIONS

"Mobile Instant Messaging through Hubbub", available at least as early as Apr. 12, 2007, at <<http://delivery.acm.org/10.1145/570000/5675011p68-isaacs.pdf? key1=567501&key2=6579736711&coll=GUIDE&dl=GUIDE&CFID=19760320&CFTOKEN=30450924, ACM, vol. 45, No. 9, 2002, pp. 68-72.

Chu, et al., "The Exclusive-Writer Approach to Updating Replicated Files in Distributed Processing Systems."In: IEEE Transactions on Computers, vol. 34, No. 6. IEEE, Jun. 1985, 12 pages.

EP0519838A1, "Improvements to devices for the remote updating of electronic pocket organizers", Lewiner, et al., Jun. 19, 1992, Orignal and translated copy, 17 pages.

JP S59-14877, "Game System", Tamura, et al., Japan, Publication: Jan. 25, 1984, Orignal and translated copy, 15 pages.

M. Lambert, "PCMAIL: A Distributed Mail System for Personal Computers." IETF RFC 1056 Jun. 1988, 39 pages.

Seybold, Andrew M.,"Using Wireless Communications in Business", ISBN 0-442-01877-0. Van Nostrand, 1994, 5 pages.

* cited by examiner

USER EXPERIENCE FOR MULTIPLE SIMULTANEOUS CONNECTIONS ON AN INSTANT MESSAGING PROGRAM

TECHNICAL FIELD

The subject matter relates generally to an instant messaging (IM) program, and more specifically, to a user experience with multiple simultaneous connections on the instant messaging program.

BACKGROUND

An IM program may offer a user access to multiple IM connections on several communication devices (e.g., a personal computer or a mobile cellular phone). Typically, these multiple connections may require the user to log in every time on the various communication devices. The multiple connections on the IM program present many challenges for users in managing and maintaining all of the connections. For example, the IM programs may provide connections to twelve devices, creating havoc on keeping track of the connections on all the devices.

Furthermore, instant messages may appear on a device that is logged on to an IM program, but is not actively participating in the IM. Unfortunately, an individual using the "inactive" device may view the instant messages without the user's permission. Even within the IM program, there is little indication of knowledge and control of the multiple connections. Thus, existing IM programs that provide multiple connections are not up to the tasks of developing a user interface in controlling the connections, monitoring all the devices that are logged on, and ensuring privacy of the user.

To further illustrate the problems of multiple connections, the user may receive repetitive instant messages on several communication devices logged on the system and may have to pay for instant messages sent to a mobile device. As a result, the user experience is often frustrating, such as viewing repetitive instant messages and having to close the instant messages separately on each communication device. The problem of instant messages on a mobile device has not been addressed. Thus, the instant messages may unnecessarily be sent to the mobile device, which can be very expensive and reduce or drain the battery power of the mobile device. Consequently, existing IM programs have not found a way to control the multiple communications transmitted to or received on the communication devices and in particular to a mobile device.

Multiple connections provide an aggregated view of a user's presence, Multiple Points of Presence (MPOP), but these programs and systems fall short in keeping the multiple connections "alive" or connected to the program. This is troublesome since the user may desire to switch communication from one device to another device. Thus, these multiple connections on instant message programs have not provided a satisfying user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes establishing multiple simultaneous connections on a program or service to enhance a user experience. The user interface and the multiple simultaneous connections on communication devices associated with the user improve the efficiency and convenience of logging on, logging out, and monitoring connections on the communication devices for any communication device, locally or remotely. Also, the user interface for multiple simultaneous connections allows the user to control and to maintain privacy of the communication.

The messenger server will establish multiple simultaneous connections for the communication devices of the user, which has a user interface to issue a notification to indicate a request for communication, a news alert, an email, or any type of alerts to the communication devices. By responding on a particular communication device, the user will cause the communication to transmit to that particular communication device, which is considered "active" at the desires of the user. To further increase the user experience, the resultant communication transmitted to or received from the active device may be replicated to the other communication devices to not miss any communication. To cater to the mobility needs of the user, the multiple simultaneous connections are kept "alive" or connected, enabling the user to switch from one device to another device without having to discontinue the communication or log in every time.

BRIEF DESCRIPTION OF THE DRAWINGS

The Detailed Description is set forth with reference to the accompanying figures. The teachings are described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
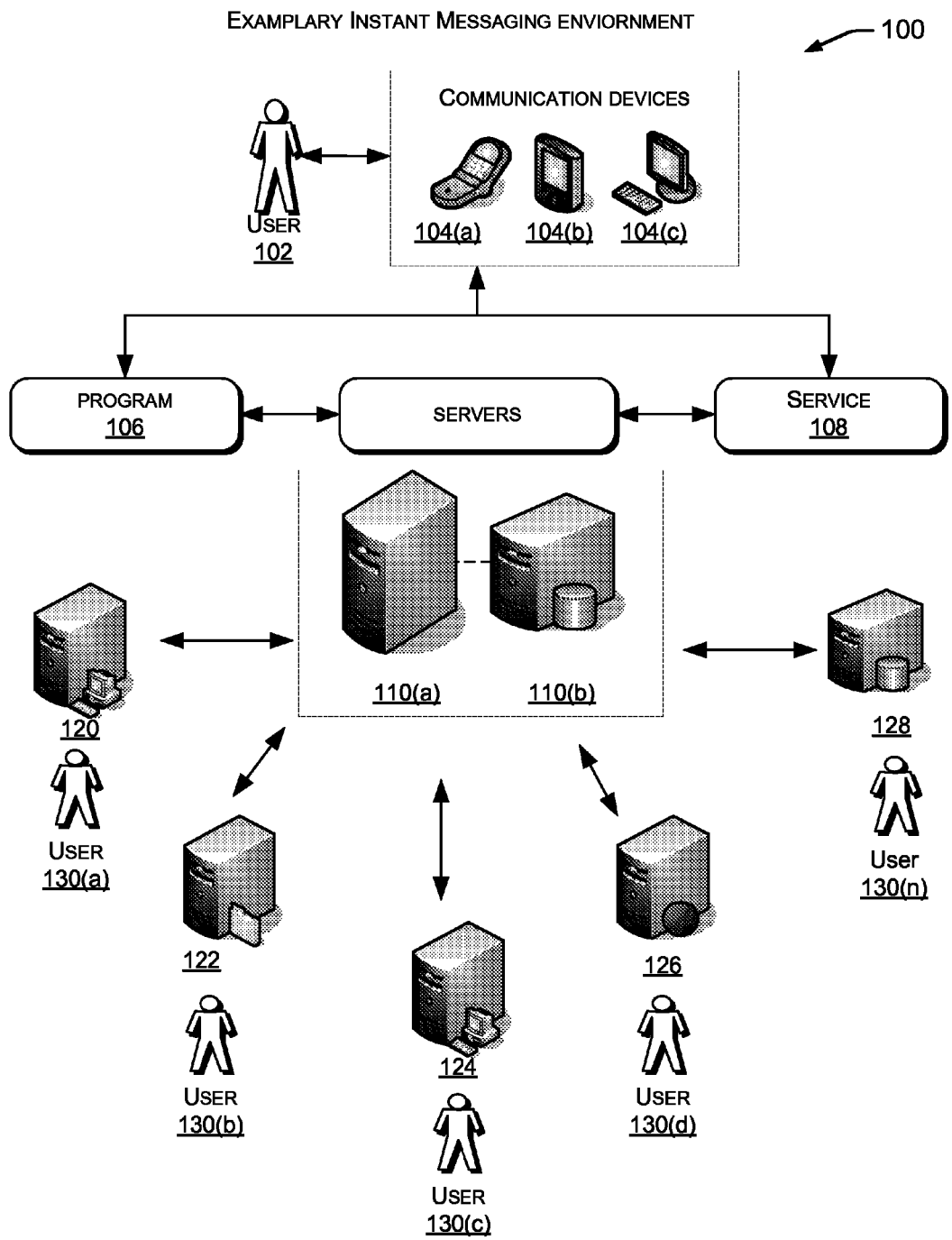
FIG. 1 is an overview block diagram of an exemplary instant messaging environment.

This disclosure is directed to multiple simultaneous connections on a program or service, and is shown and described in the context of enhancing a user experience. This enhancement is accomplished through user interfaces, user interactions, servers, and system responses. The user interface for the multiple simultaneous connections allows the user to maintain and to control connections on the communication devices and to ensure privacy. The user is aware of which communication devices are connected to the program. A benefit to the user is that signing in or logging on to an IM program on a new communication device will not cause the other communication devices to sign out or log off the program. Furthermore, the user interface ensures the user options for privacy by choosing to hide instant messages on a communication device that is not actively participating in the communication.

In one aspect, an algorithm, known as a non-mobile algorithm, responds to the notification requesting communication, email, or alerts. The non-mobile algorithm constructs a state diagram for sending the notifications, emails, or alerts to the communication devices that are logged into an IM program. If the user responds on the non-mobile device, the communication continues to transmit to and receive from the non-mobile device, in the active mode.

In another aspect, another algorithm, known as a mobile algorithm, responds to the notification requesting communication, email, or alert. The mobile algorithm constructs a state diagram for sending the notifications or alerts to the communication devices that are logged into an IM program. If the user responds on the mobile device, the communication continues to transmit and to receive from the mobile device, which is in the active mode.

In another aspect, another algorithm, known as switching algorithm, responds to the user switching communication from one communication device to another device. The switching algorithm constructs a state diagram for sending the notifications, emails, or alerts to the communication devices that are logged into an IM program. For example, the user responds on a first device continuing the communication to transmit to and receive from the first device, which is in the active mode. To further enhance the user experience, the multiple simultaneous connections are alive, enabling the user to switch from one communication device to another device without having to discontinue the communication or logging back into the program.

Thus, the user interface and the multiple simultaneous connections on the IM program vastly improve the efficiency and convenience of the user experience. The user experience for multiple simultaneous connections described herein are not limited to any particular application or network, but may be applied in many contexts and environments. By way of example and not limitation, the user experience for multiple simultaneous connections may be employed in IM programs, IM services, IM networks, programs, applications, networks, and the like. For example, the user experience on different communication devices with multiple simultaneous connections could be used in .NET Messenger Service, MSN® Messenger, Windows Live™, Windows Live™ Messenger, Windows Mobile®, Windows®, and Windows Vista™.

Exemplary Instant Messaging Environment

FIG. 1 is an overview block diagram of an exemplary instant messaging (IM) environment 100 for providing IM access. A user 102 with communication devices 104 may access IM through an application program 106 or a service 108. IM provides real-time communication, which means current or actual communication between two or more users or supports asynchronous communication like offline messages. The term "user" 102, and "consumer" may be used interchangeably to describe a person or an entity using a communication device and/or a person or an entity subscribing to a program or service. The programs 106 or the services 108, include technology resources, which include access to the web, databases, email, file sharing, voice, video, games, software programs, and the like.

Communication devices 104 that are suitable for use, include but are not limited to, a cellular phone 104(a), a personal digital assistant 104(b), a personal computer 104(c), and the like. These various types of communication devices 104 in operation with the programs 106 or the services 108 enable the user 102 to conduct an activity, such as communicating with others, transmitting or receiving data, text, video, audio, email, accessing web pages for information, accessing shared folders, or files, sharing information with others, and the like. The user 102 may access the application 106 or service 108 for work related purposes or for personal use. The terms application and program are used interchangeably to describe capabilities that allows the user 102 access to real-time communication, such as IM, or asynchronous communication like offline messages. For example, the program or application may be downloaded onto the user's communication devices 104.

Figure 3:
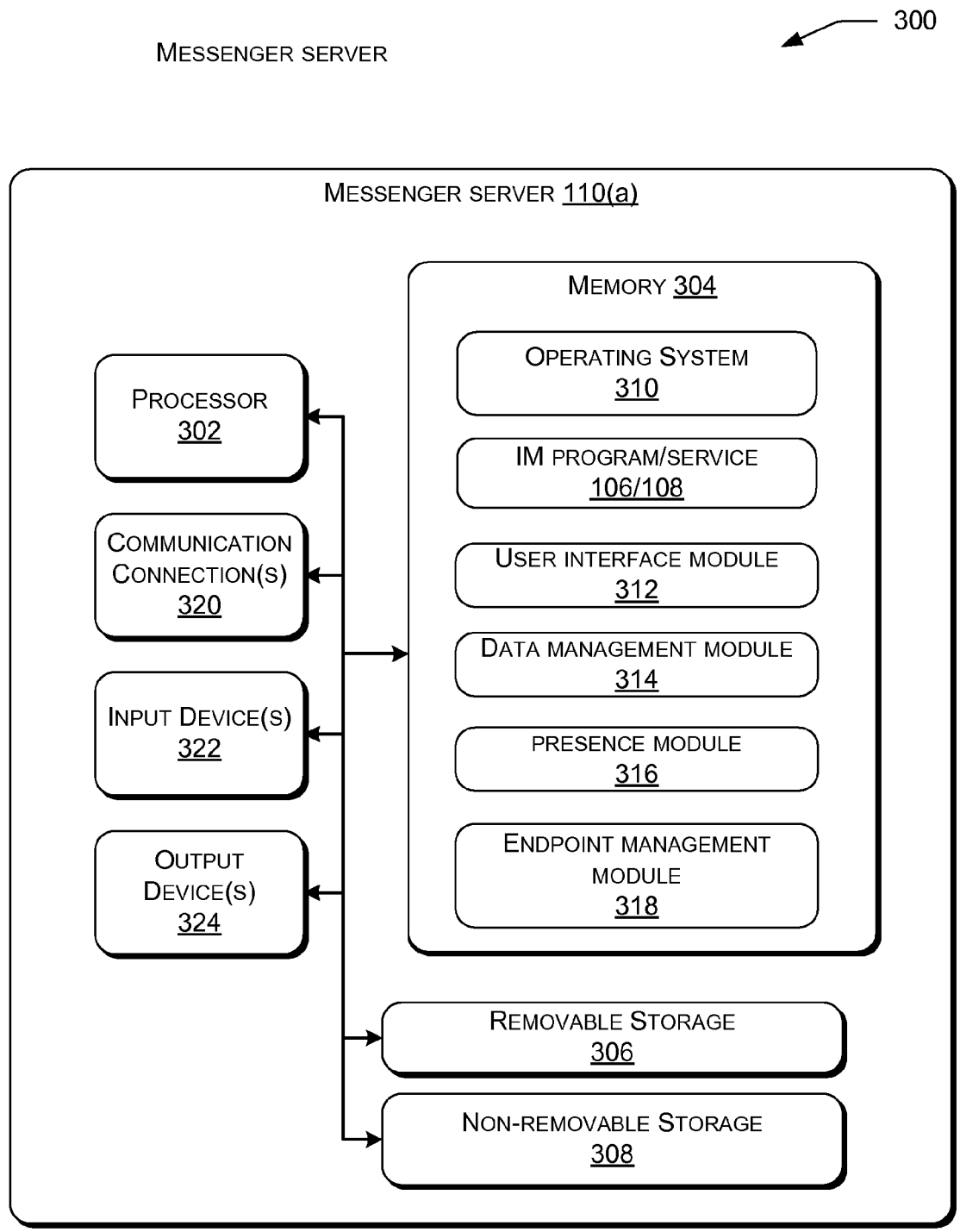
FIG. 3 is a block diagram showing an exemplary messenger server of the system of FIG. 2.

Shown in FIG. 1, is an exemplary implementation of a messenger server 110(a) implementing the IM application 106 or IM service 108 on a network or an IM network (not shown). A mobile server 110(b) may be included to help manage the mobile communication devices working in cooperation with the messenger server 110(a). The network or the IM network may be defined as hardware, software, and media connecting information technology resources. Typically, networks or IM networks are formed by connecting clients, servers, a number of other components like routers, switches, and the like through a communication media. FIG. 3 discusses the messenger server 110(a) in more detail.

Illustrated in FIG. 1 is the messenger server 110(a) that provides the program 106 or the service 108 to the communication devices 104 of the user 102, to communicate in real-time or support asynchronous communication like offline messages with one or more computing devices of individuals. The computing devices, may include, but are not limited to a personal computer 120, a file server 122, a management server 124, a web server 126, a database server 128, and the like. These devices may be associated with individuals known as user 130(a), 130(b), . . . 130(n) or with other individuals, businesses, education facilities, government associations, hospitals, and the like.

Figure 2:
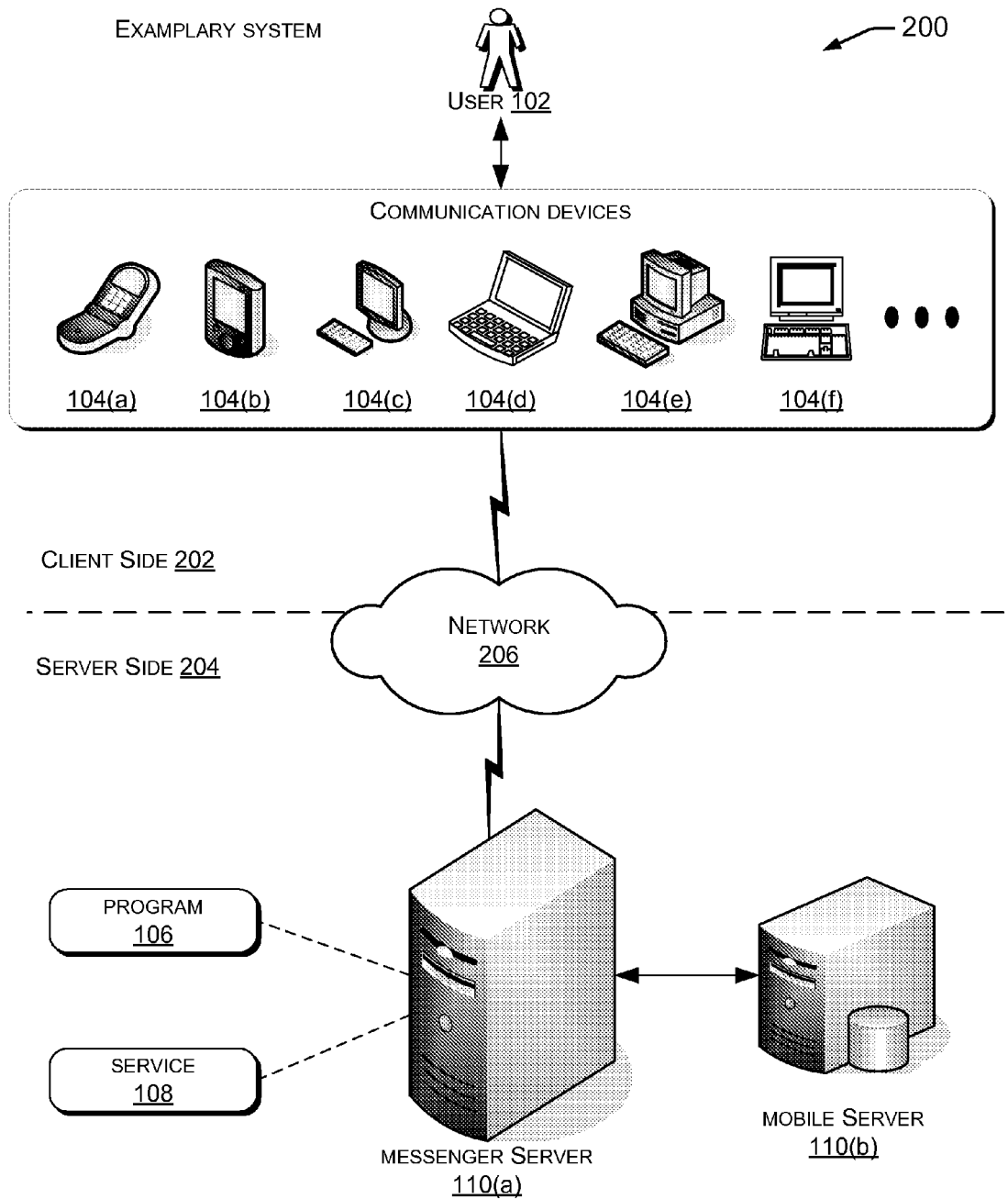
FIG. 2 is a block diagram of an exemplary instant messaging system.

Turning to FIG. 2, this figure illustrates an exemplary system 200 for implementing the IM program of multiple simultaneous connections to enhance the user experience. The system 200 illustrates architecture of some components on a client side 202 and a server side 204. Alternatively, these components may reside in multiple other locations. For instance, all of the components of FIG. 2 may exist on the client side 202. Furthermore, two or more of the illustrated components may combine to form a single component at a single location.

The client side 202 includes communication devices 104 to provide real-time communication or support asynchronous communication like offline messages on the system 200. The term "communication device" means a device allowing the user 102 to interact with an electronic information system or the like. The communication devices 104 include but are not limited to, a cellular phone 104(a), a personal digital assistant (PDA) 104(b), a personal computer 104(c), a laptop computer 104(d), a desktop computer 104(e), a workstation 104(f), or other similar devices. The devices 104 that are considered non-mobile, include the personal computer 104(c), the laptop computer 104(d), the desktop computer 104(e), and the workstation 104(f). The devices 104 that are considered mobile, include the cellular phone 104(a), the PDA 104(b), and the laptop computer 104(d).

As illustrated, the server side 204 of the system 200 includes an IM program 106, an IM service 108, a messenger server 110(a), and a mobile server 110(b). Shown are two options of providing IM access, the program 106 and the service 108, which are merely examples and are not to be limiting. The user 102 downloads the IM program 106 from an IM provider to the communication devices 104. The user 102 may access the IM service 108 through a web service provider or web browser without having to download software. This is advantageous when accessing IM through a public facility, such as the library, employer's computer, communication devices with limited memory capacity, and the like. Having described the messenger server 110(a) and the mobile server 110(b) as separate entities, a single messenger server may serve both functions.

FIG. 2 specifically illustrates the messenger server 110(a) and the mobile server 110(b) on the server side 204 communicating via a network 206 with the communication devices 104 on the client side 202. The network 206 may include the Internet, a Local Area Network (LAN), a Wide Area Network (WAN), a wireless network, business WiFi LANs, home WiFi LANs, public WiFi hotspots, WiMAX wide area networks, cellular technologies, and/or the like. Also, the cellular devices function in either unlicensed wireless or licensed cellular technologies, such as unlicensed IEEE 802.11 wireless networking standard and licensed cellular technology, such as global system for mobile communications (GSM) or code division multiple access (CDMA).

In an exemplary implementation, the user 102 may use the laptop computer 104(d) at home by accessing a WiFi LAN located in his or her home. The WiFi LAN may enable the user 102 to access a broadband data service, such as Digital Subscriber Line (DSL) service, satellite Internet service, or cable modem service.

Messenger Server

FIG. 3 illustrates example components, denoted generally at 300, within the messenger server 110(a) of FIG. 2 in more detail. The messenger server 110(a) may be configured as any suitable computing device capable of implementing an IM program 106 or service 108 with multiple simultaneous connections. In one exemplary configuration, the messenger server 110(a) comprises at least one processing unit 302 and memory 304. The processing unit 302 may be implemented as appropriate in hardware, software, firmware, or combinations thereof. Software or firmware implementations of the processing unit 302 may include computer- or machine-executable instructions written in any suitable programming language to perform the various functions described.

Memory 304 may store programs of instructions that are loadable and executable on the processor 302, as well as data generated during the execution of these programs. Depending on the configuration and type of computing device, memory 304 may be volatile (such as RAM) and/or non-volatile (such as ROM, flash memory, etc.). The messenger server 110(a) may also include additional removable storage 306 and/or non-removable storage 308 including, but not limited to, magnetic storage, optical disks, and/or tape storage. The disk drives and their associated computer-readable media may provide non-volatile storage of computer readable instructions, data structures, program modules, and other data for the communication devices.

Turning to the contents of the memory 304 in more detail, may include an operating system 310, one or more application programs 106 or service 108 for implementing all or a part of the instant messaging program with multiple simultaneous connections. In one implementation, the memory 304 includes the IM program 106 including a user interface module 312 and a data management module 314. The user interface module 312 includes but is not limited to, presenting the user with a user interface for the IM program to sign or sign out of the program, to prompt the user to indicate presence, to illustrate messages are on hold or not shown, and to display connected and disconnected communication devices 104. The data management module 314 stores and manages storage of information, such as profile information, contact information, display picture, sounds, communication devices of the user 102, and the like, and may communicate with one or more local and/or remote databases or services.

The memory 304 further includes a presence module 316 and a data management module 318. The presence module 316 may identify signing in and out of the IM program 106, the status of the user 102, and the like. The endpoint management module 318 includes but is not limited to, tracking a state of the different communication devices 104, signing in and out of the IM program 106, and the like. The endpoint management module 318 interacts with the presence module 316 and the data storage module 314 to perform connections, disconnections, search functions, such as performing searches to identify the communication devices that are logged on, logged off, state of the communication devices, the status of the user 102, and the like.

Computer storage media includes volatile and non-volatile, removable and non-removable media implemented in any method or technology for storage of information such as computer readable instructions, data structures, program modules or other data. Memory 304, removable storage 306, and non-removable storage 308 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the messenger server 110(a) or other computing device.

The messenger server 110(a) may also contain communications connection(s) 320 that allow the messenger server 110(a) to communicate with the mobile server 110(b), the user terminals, and/or other devices on the network 206. Communications connection(s) 320 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The messenger server 110(a) may also include input device(s) 322 such as a keyboard, mouse, pen, voice input device, touch input device, etc., and output device(s) 324, such as a display, speakers, printer, etc. The messenger server 110(a) may include a database hosted on the messenger server 110(a) include, but is not limited to, a contact list, profile information, display name, display picture, mobile phone number, network addresses, list of the communication devices 104, and the like. All these devices are well known in the art and need not be discussed at length here.

Multiple Simultaneous Connections with Mirroring

Figure 4:
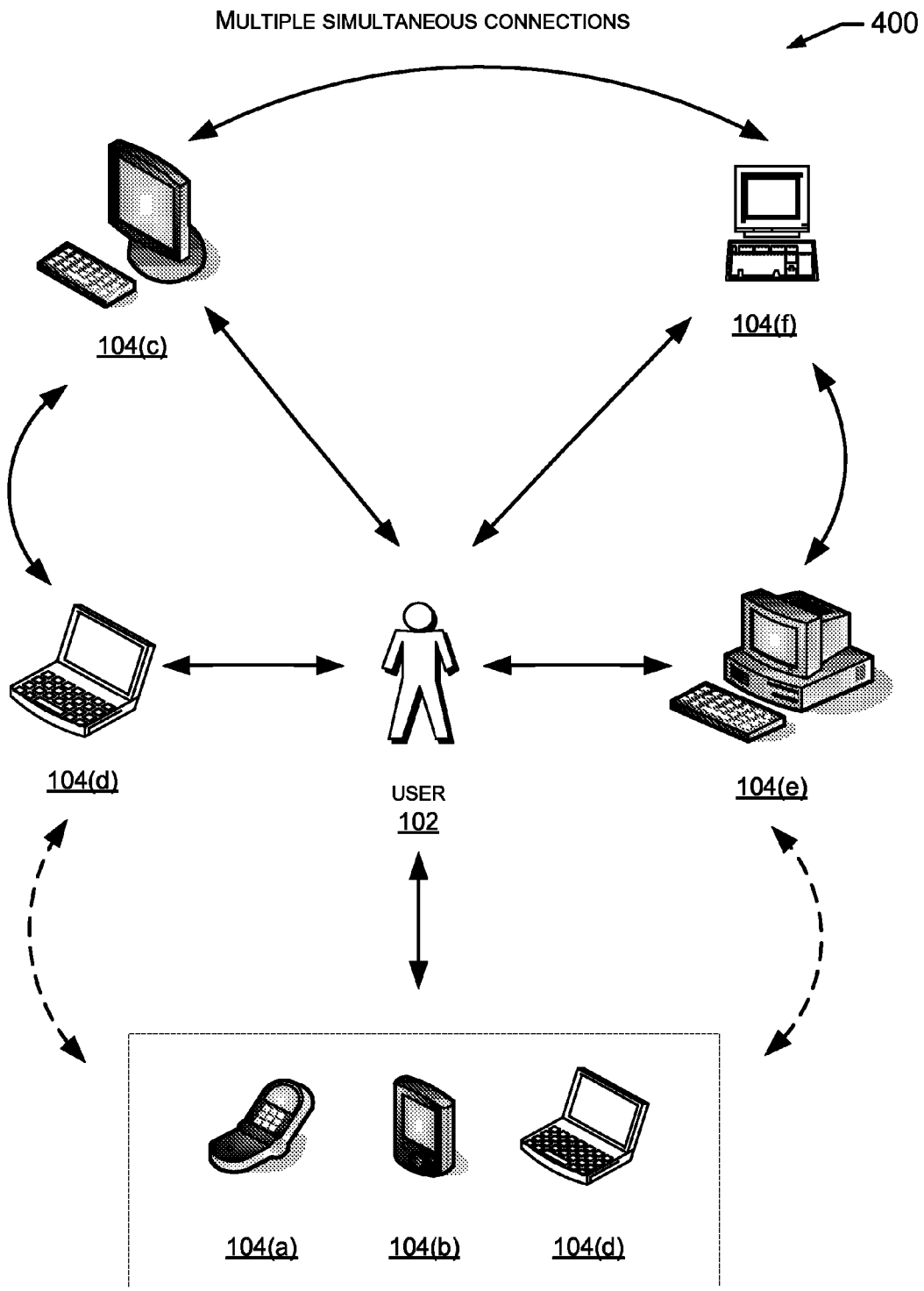
FIG. 4 is block diagram of an exemplary multiple simultaneous connections to enhance the user experience of the system of FIG. 2.

FIG. 4 is a block diagram illustrating mirroring of the communication and establishing multiple simultaneous connections 400 for implementing the exemplary IM system of FIG. 2. The solid lines extending from the user 102 indicate signing in or logging on to the messenger server 110(a) to establish the multiple simultaneous connections. The user 102 signs on to the IM program 106 with the communication devices 104, which may also be referred to as endpoints. The system 200 enhances the user experience by allowing the user 102 to log on or sign in to one communication device 104 without logging off or signing out of another communication device 104. In an exemplary implementation, the multiple simultaneous connections will transmit communication to all of the alive non-mobile communication devices to ensure the user 102 will not miss any messages.

In an exemplary implementation, the user 102 signs in on a desktop computer 104(e) at home. The cellular phone 104(a) automatically signs in to the IM program 106 upon activating the communication device 104, without signing off the user 102 from the desktop computer 104(e). Thus, the user 102 may respond on the desktop computer 104(e) or the cellular phone 104(a).

In an exemplary implementation, when the user 102 signs in a second communication device 104 to the IM program 106, by default, the messages and notifications sent to the first communication device will be put on hold. In another implementation, the user 102 may decide to not put messages on hold. The messages and notifications will continue to transmit to the first device but the windows are hidden and the sounds associated with receiving IM are muted. Thus, the user 102 may protect the privacy of the communication and avoid annoying sounds and popups for a person using the first communication device, such as the desktop computer 104(e).

Once the user 102 signs in or logs on a new communication device 104 to the IM program 106, a notification of a new connection alerts the user 102. This new connection is included on a list of the communication devices 104 connected on the IM program 106. Thus, the user 102 may monitor and control the connections of the communication devices 104, remotely and locally. An added benefit is that the user 102 may disconnect the communication device 104 remotely.

Notifications sent to the user 102 include but are not limited to, a request for communication, alert, email, sports scores, news alerts, and other types of contents. The notifications may further include ring tones, audible notifications, or visual indications. The term "approximately" indicates that the notifications may arrive at two or more communication devices 104 at slightly different times, owing to device capabilities, network conditions, geographical factors affecting the different devices, and the like. The messenger server 110(a) sends or issues notifications for the request for communication, email, or alert to the communication devices 104 signed or logged into the IM program. Once the user 102 responds on a particular communication device, the communication continues to transmit to that particular communication device, which is considered in the "active" mode and particularly, at the desires of the user 102.

To ensure the user 102 does not miss any communication, the messenger server 110(a) replicates or mirrors the resultant communication transmitted to or received from the active communication device to the other non-mobile communication devices. For illustrative purposes, the solid lines illustrate the communication replicated or mirrored on the non-mobile communication devices. For example, the user 102 responds on the laptop computer 104(d), so communication may be replicated or mirrored from the laptop computer 104(d) (in the active mode) to the personal computer 110(c) to the workstation 104(f) and to the desktop computer 104(e). This may vary depending on which communication devices 104 are in the active mode and which communication devices 104 are signed into the IM program. This is for illustration purposes only as there is no particular order.

In an exemplary implementation, the presence and communication is synchronized across all the communication devices 104. The user 102 signs on and the presence information is kept in synchronization across all the endpoints, enabling the users 130(a) . . . 130(n) to monitor the user's presence. Also, the synchronization allows the user 102 to retrieve information, files, audio, and the like on a non-mobile device that was initially sent to the mobile device.

In FIG. 4, the dashed lines illustrate the communication from the non-mobile communication devices that may be mirrored or replicated to and from the mobile devices. The dashed lines indicate the communication may be replicated or mirrored when the user 102 responds on the mobile device. For example, the user 102 responds on cellular phone 104(a), the communication will be replicated to the non-mobile devices.

Figure 6:
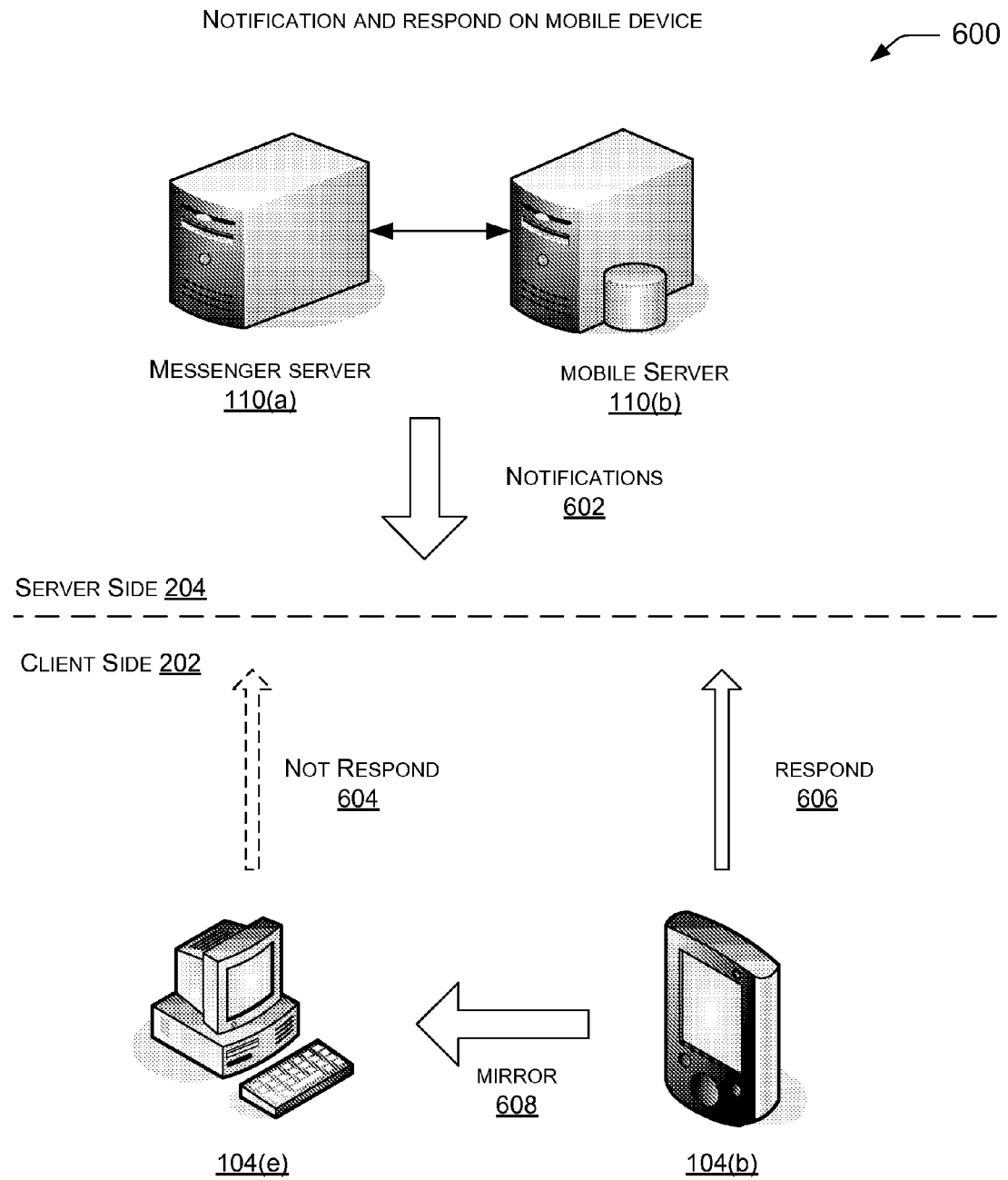
FIG. 6 is a flowchart showing an exemplary algorithm for notifying and responding on a mobile device of the system of FIG. 2.
Figure 7:
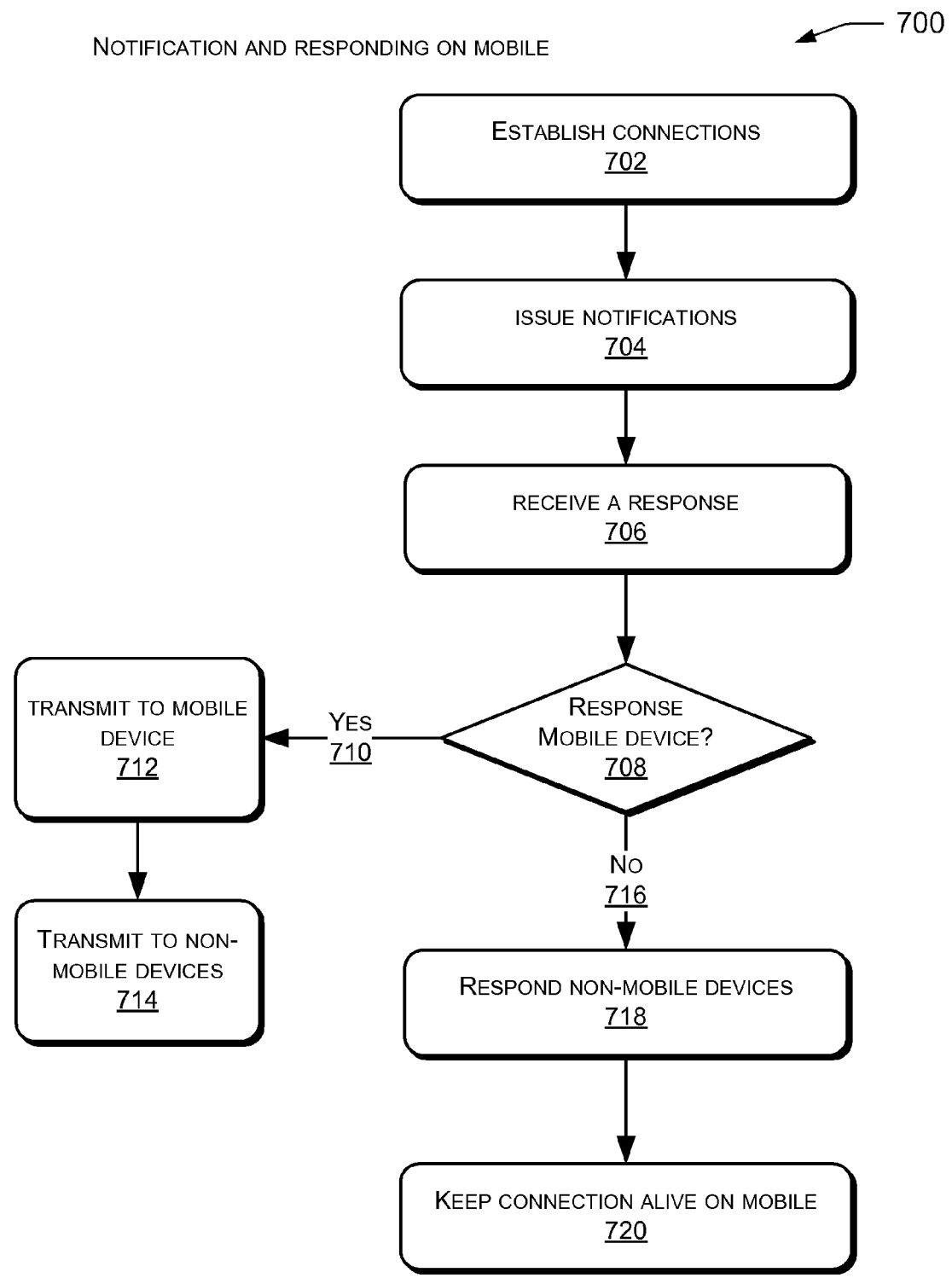
FIG. 7 is a flowchart showing an exemplary process for notifying and responding on a mobile device of the algorithm of FIG. 6.

However, if the user 102 chooses to not respond on the mobile device and responds on the non-mobile device, the communication transmitted to and from the non-mobile communication devices will not be replicated or mirrored to the mobile devices. This is to prolong battery power of the mobile device and to not incur expenses for use of the mobile device. Thus, the messenger server 110(a) will not replicate or mirror the communication on the mobile device. However, the connection is kept alive on the mobile device. Furthermore, the user 102 may retrieve a history of the communication transmitted on the non-mobile communication devices, by selecting an option on the mobile device. FIGS. 6 and 7 will discuss this in more details.

In an exemplary implementation, the user 102 may sign in to three communication devices, such as the mobile phone 104(a), personal computer 104(c), and laptop computer 104(d), and receive notification of request for communication, email, or alerts on these communication devices. Assuming the user 102 receives notifications, for example, on all three communication devices, the messenger server 110(a) sends the notifications to the number for the mobile phone 104(a) and the identified network addresses for the personal computer 104(c) and the laptop 104(d).

In an exemplary implementation, the user 102 may access IM on the laptop computer 104(d) or the desktop computer 104(e) while away from home or the office. By way of illustration, the user 102 may access his or her own desktop computer 104(e) remotely, without being in or near the office. In another example, the user 102 may close a conversation on one communication device 104, which will close conversation on all of the communication devices 104. This makes it more efficient for the user 102 in not having to view repetitive messages and having to close each conversation on all of the communication devices 104.

Responding to Notification

Figure 5:
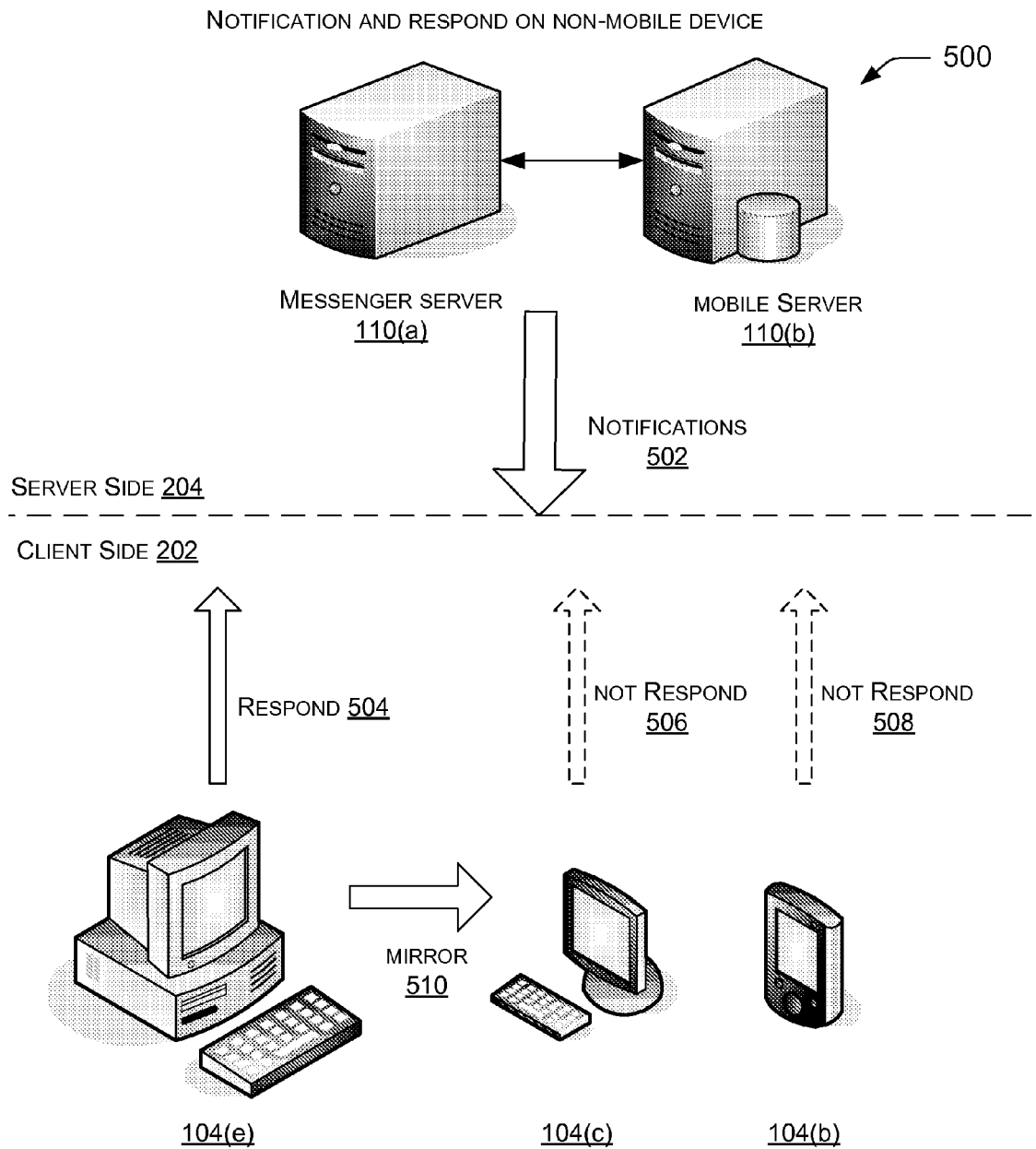
FIG. 5 is a block diagram of an exemplary algorithm for notifying and responding on a non-mobile device of the system of FIG. 2.

FIGS. 5-7 illustrate exemplary ways in which the user 102 associated with the communication devices 104 may respond to the notification to respond, the alert, or email. For convenience only, the process flows are described in connection with certain components shown in FIGS. 2 and 4. However, it is understood that the process flows may be performed with other components without departing from the spirit and scope of the description. These processes highlight additional actions facilitated by responding, and do not replace the multiple simultaneous connections protocol 400. Instead, the processes of FIGS. 5-7 may be utilized in conjunction with and in addition to process 400.

FIG. 5 illustrates an exemplary process 500 for responding to the notification to request communication, email, or alert. An algorithm, known as a non-mobile algorithm, sends a notification from the messenger server 110(a), on the server side 204 and waits for a response to the notification requesting communication, email, or alert. As mentioned previously, the mobile server 110(b) may be included as a separate component. The non-mobile algorithm constructs a state diagram for sending the notifications or alerts to the communication devices 104, located on the client side 202. If the user 102 responds on the non-mobile device, the communication continues to transmit to and receive from the non-mobile device, which is in the active mode.

This algorithm 500 is described with reference to the desktop computer 104(e), the personal computer 104(c), and the PDA 104(b), while other devices may similarly utilize this process. Shown at Notifications 502, represent the messenger server 110(a) sending or issuing notifications of a request to respond to a communication invitation, email, or alert to the three communication devices, that are signed in to the program 106. At Respond 504, represents the desktop computer 104(e) sending a response to the messenger server 110(a), to respond to the invitation request, alert, or to receive email on the desktop computer 104(e).

Illustrated at Not Respond 506, the personal computer 104(c) connection is kept alive, but is not active, due to not responding. Shown at Not Respond 508, represents the PDA 104(b) not responding to the messenger server 110(a) to the request to communicate, alert, or to receive email on the PDA 104(b). Again, the connection for the PDA 104(b) is kept alive.

In an exemplary implementation, the PDA 104(b) does not respond to the notification, the PDA 104(b) will display a message informing the user 102 that the communication was answered on another communication device 104, also referred to as another endpoint. Furthermore, the user 102 has an option to resume the communication on the PDA 104(b) by taking further action. In another example, the user 102 may query the last several messages sent to the desktop computer 104(e), and choose to resume the communication on the PDA 104(b) after reviewing the history.

At Mirror 510, represents the communication sent to the active desktop computer 104(e) is replicated or mirrored to the personal computer 104(c), which is signed in or logged on, but is not actively used to participate in the communication and is a non-mobile device. Replicating or mirroring communication comprises receiving notifications, transmitting and receiving communication or instant messages, changing presence information, changing profile information, changing contact list, changing group information, and opening and closing a conversation on the active device is mirrored on the other one or more non-active and non-mobile devices associated with the user 102. The mirroring improves the efficiency and convenience for the user 102, who does not view repetitive messages or need to close conversations on each communication device 104 signed or logged into the system 200.

FIG. 6 illustrates a process 600 for responding to the notification to request communication, the email, or the alert. An algorithm, known as a mobile algorithm, responds to the notification requesting communication, email, or alert. The mobile algorithm constructs the state diagram for sending the notifications or alerts to the communication devices 104 located on the client side 202. If the user 102 responds on the mobile device, the communication continues transmitting to and receiving from the mobile device, which is in the active mode.

This algorithm 600 is described with reference to the desktop computer 104(e) and the PDA 104(b), while other devices may similarly utilize this process. Shown at Notifications 602, represent the messenger server 110(a) on the server side 204 sending the notifications of the request to respond to the communication invitation, email, or alert. The mobile server 110(b) may be included with the messenger server 110(a) on the server side 204. By way of illustration, the desktop computer 104(e) and the PDA 104(b) may receive this notification.

Shown at Not Respond 604, represents the desktop computer 104(e) not responding to the messenger server 110(a) to the communication request, to receive email, or alert on the desktop computer 104(e). However, the connection is kept alive on the desktop computer 104(e).

At Respond 606, represents the PDA 104(b) responding to the messenger server 110(a) to the request for communication, to receive email, or the alert on the PDA 104(b). The communication will continue to transmit to and receive from the PDA 104(b).

At Mirror 608, represents the communication sent to the active device, the PDA 104(b), is replicated or mirrored to the inactive and non-mobile device, the desktop computer 104(e). Thus, the replicating or the mirroring of the communication allows the user 102 to close the communication without viewing repetitive messages and to ensure the communication is sent to the alive communication devices, in order to not miss any messages. Also, the user 102 may be able to retrieve files or email later on the non-mobile device, the desktop computer 104(e), if the user 102 initially received the file or video when the user 102 was communicating on the PDA 104(b), in the active mode.

In an exemplary implementation, the user 102 may be actively participating in a conversation on the desktop computer 104(e). The messenger server 110(a) sends notifications of incoming new messages, emails, or alerts to the PDA 104(b) only when there is no activity on other non-mobile devices, based on the user's profile.

Similar to the algorithms described above, a switching algorithm, describes how the user 102 may switch communication from a first communication device to a second communication device. The switching algorithm constructs a state diagram for sending the notifications or alerts to the communication devices 104 that are logged on to the IM program 106. The user 102 responds on the first device, the communication is transmitted to and received from the first device, which is in the active mode. To further enhance the user experience, the multiple simultaneous connections are kept alive, enabling the user 102 to switch from the first device to the second device without having to discontinue the communication.

In an exemplary implementation, the user 102 may sign into three communication devices, the mobile phone 104(a), the personal computer 104(c), and the laptop 104(d), receive notifications of request for communication, email, or alert on these communication devices. For example, the user 102 responds on the personal computer 104(c) and wants to switch to the laptop computer 104(d) in order to be mobile. As the laptop computer 104(d) is alive, the user 102 may easily activate the laptop computer 104(d) to start transmitting and receiving communication. Thus, this enhances the mobility features for the user 102.

FIG. 7 illustrates a process flow 700 for responding to the notification to request communication, email, or alert on the mobile device of FIG. 6. For ease of understanding, FIG. 7 shows various aspects of the method 700 within separate blocks. However, FIG. 7 shows these blocks in the order presented only for convenience, but not for limitation. Implementations of the processing represented in these blocks may perform this processing in any order, without departing from the scope and spirit of the description.

In addition, implementations of the process flow 700 may combine or further subdivide any number of the described process blocks. Moreover, implementations of the process flow 700 may omit one or more of the described blocks. For convenience only, the process flow 700 is described in connection with certain components shown in FIGS. 2, 3, and 6. However, it is understood that the process flow 700 may be performed with other components without departing from the spirit and scope of the description.

Block 702 represents the messenger server 110(a) establishing multiple simultaneous connections when the user 102 logs on to the IM program 106 or IM service 108. Once signed in, multiple points of presence (MPOP) of the communication devices 104 will be available to show the list to the user 102 and to synchronize the presence information of the user 102 across all endpoints. By way of illustration, the desktop computer 104(e) and the PDA 104(b) are the non-mobile and mobile communication devices, respectively. This presence information may include, for example, the communication devices that are active and alive, the status of the user 102, friendly name, personal status message (PSM), display picture, network addresses, cellular numbers, and the like.

Block 704 represents issuing or sending notifications of request to communicate, email, or alert from the messenger server 110(a) through the IM program 106 or the IM service 108. By way of illustration, the desktop computer 104(e) or the PDA 104(b), may receive notifications from the messenger server 110(a) based on the user's profile information, the active and alive modes of the communication devices 104 and a number/a network address for the communication devices 104. The messenger server 110(a) is one example, but other services or one or more servers relating to the IM program may be connected to an application server to send this notification.

Additionally, distinctive alert or tones may accompany the transmission in blocks 704 to distinguish the notifications as a request, an email, an alert, or an urgent message. These types of notifications may further include audible notifications, visual indications, vibrations, and the like, depending on the communication devices and the user's profile.

Block 706 represents receiving a response from the user 102 in response to the request, email, or alert. Block 708 represents a decision for the user 102, whether to respond on the mobile device, the PDA 104(b). If the conditions to the notification conditions are satisfied, then the process flow may take Yes branch 710 to block 712 to continue or to send the communication to this mobile device, PDA 104(b). Being in the active mode indicates communication is transmitted to or received on this mobile device.

From block 712, the process flow may proceed to block 714, where the communication is transmitted to the non-mobile devices. Only the non-mobile devices that are alive will receive communication transmitted on the mobile device. Thus, the communication to the mobile device, PDA 104(b) is replicated or mirrored to the non-mobile devices.

Furthermore, blocks 712 and 714 may be transmitted over one or more networks, as the mobile communication device passes into the proximity of other networks. The process flow 700 may transmit the notification over a circuit-switched network and/or a packet-switched network.

Returning to block 708, which represent the decision whether to respond to the notification on the PDA 104(b). If the conditions to responding on the mobile device are not satisfied, then the process flow may take No branch 716 to block 718. Block 718 represents the non-mobile device responding to the notification and the communication transmitting to the non-mobile communication device, the desktop computer 104(e). As mentioned, the user 102 may be able to retrieve files or video later on the non-mobile devices, such as the desktop computer 104(e), when the user 102 initially received the file or video while the PDA 104(b) was in the active mode. However, once the user 102 responds to the invitation for a video file on one communication device, the other invitations may be cancelled.

Block 720 illustrates the connection is kept alive on the mobile device, the PDA 104(b), even though the user 102 did not respond on that device. By keeping the connection alive, the user 102 may switch from the desktop computer 104(e) to the PDA 104(b) while continuing the communication.

Exemplary User Interface

Figure 8:
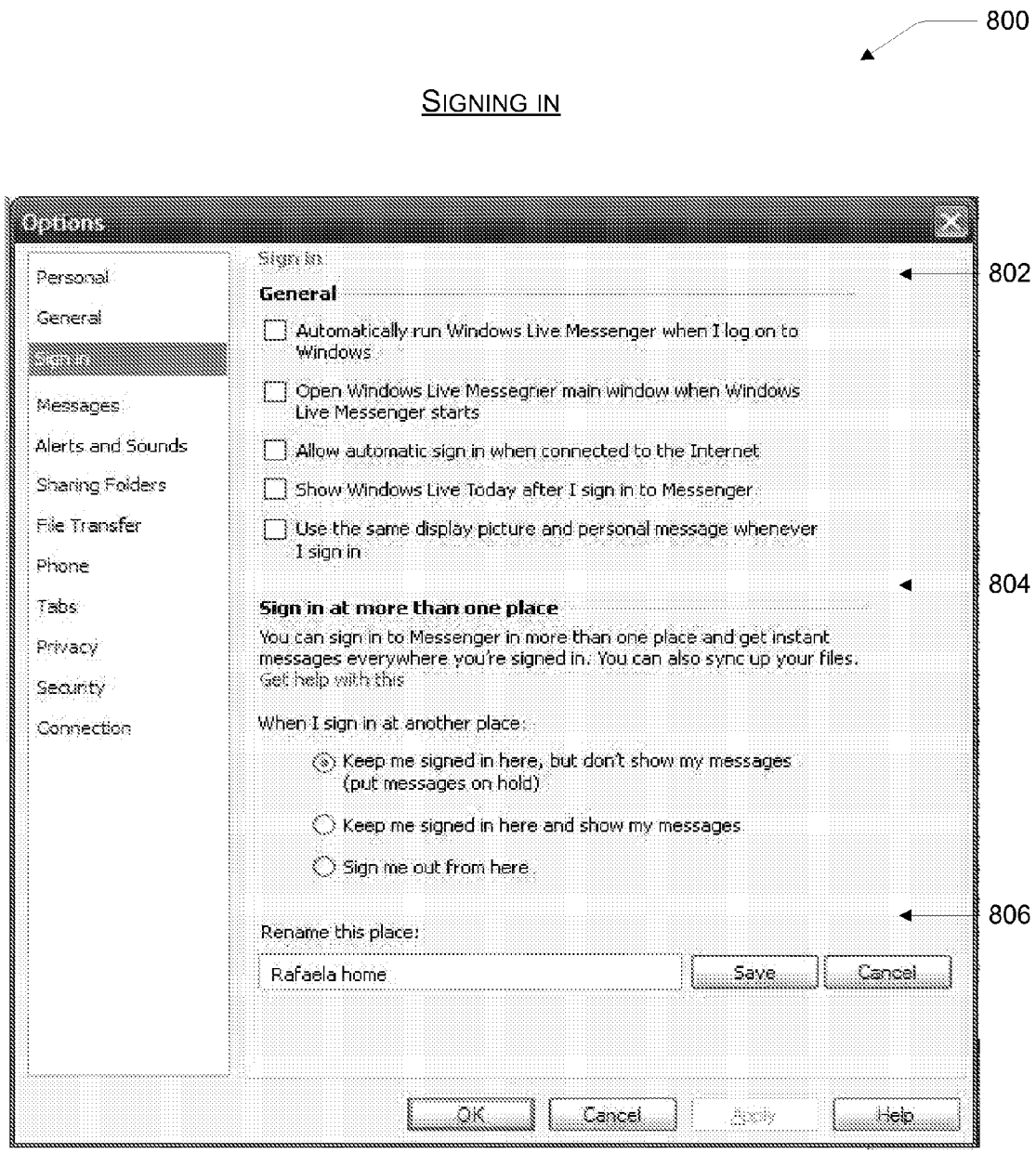
FIG. 8 is a schematic showing an exemplary user interface for signing in of the system of FIG. 2.
Figure 9:
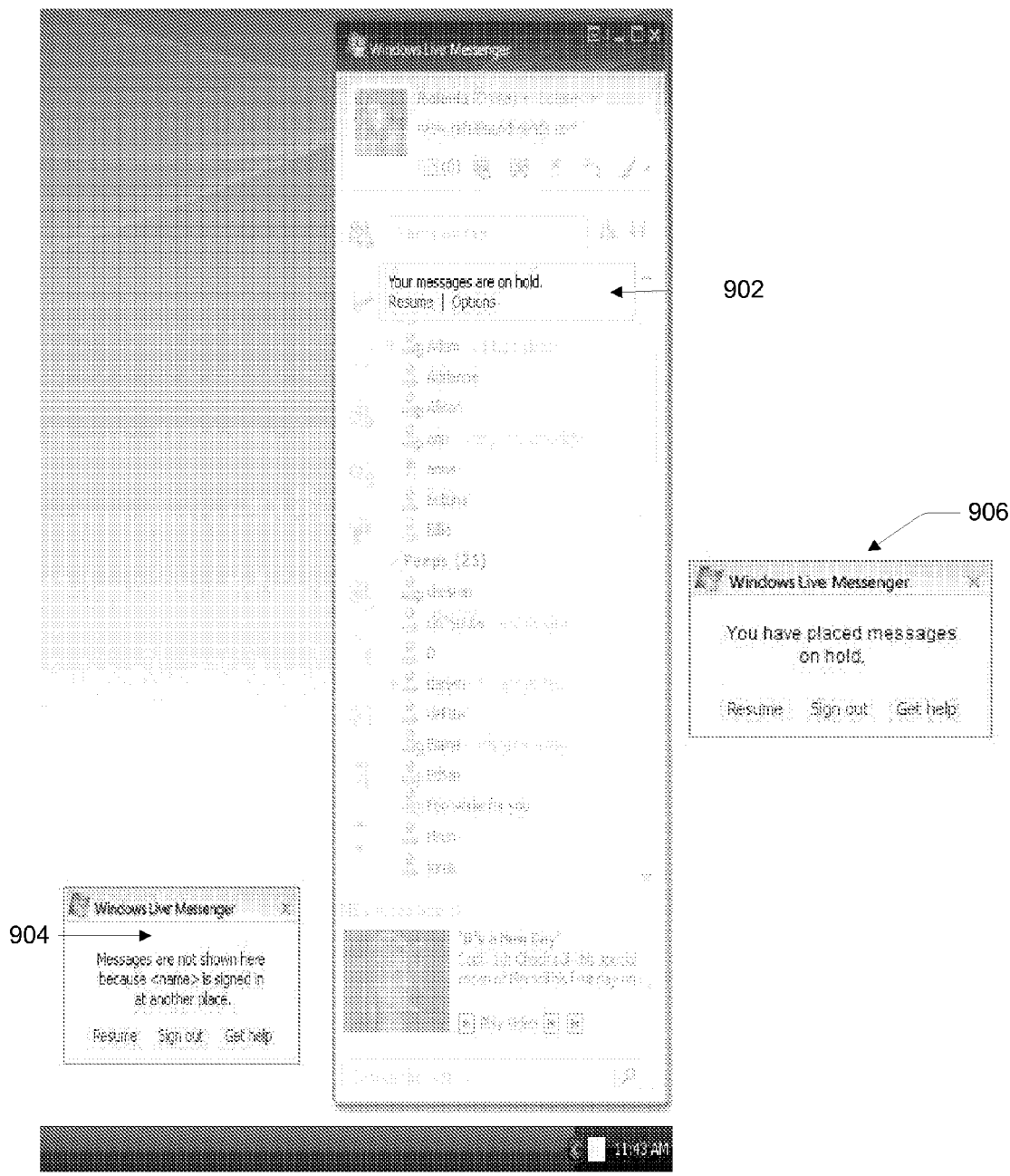
FIG. 9 is a schematic showing an exemplary user interface for privacy options of the system of FIG. 2.
Figure 10:
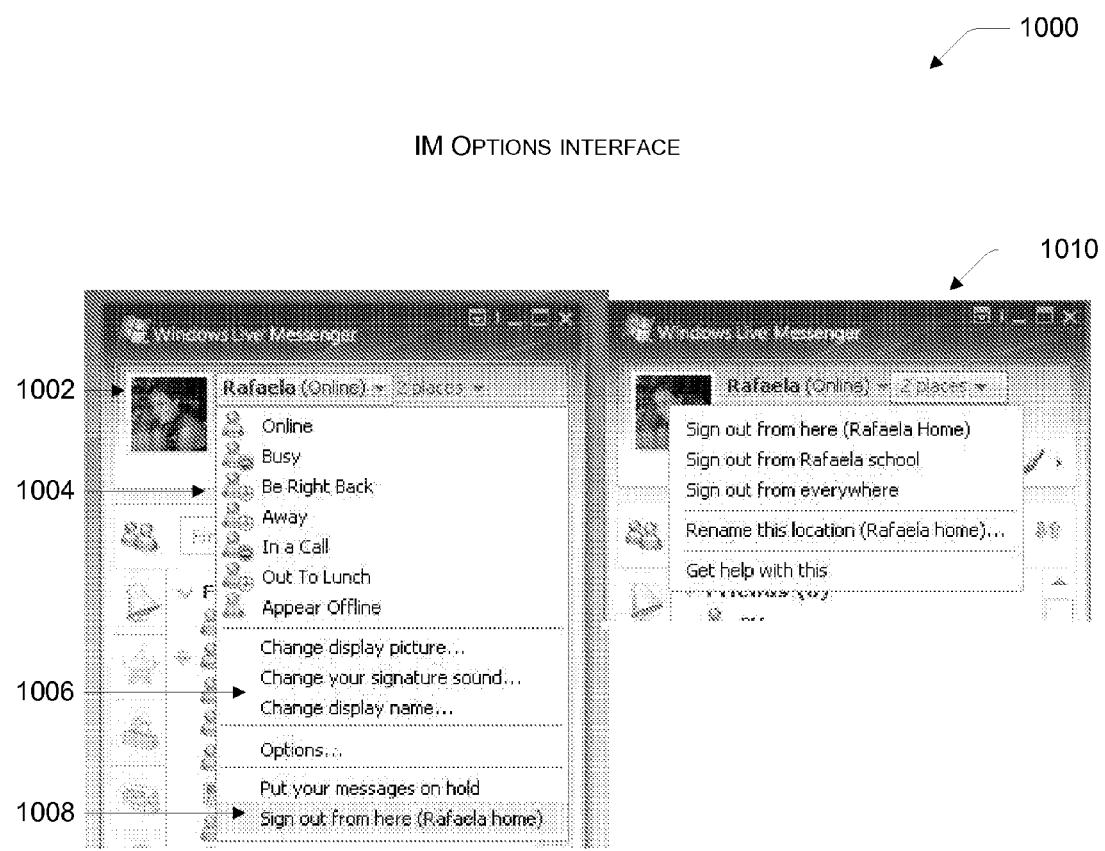
FIG. 10 is a schematic showing an exemplary user interface for interactive options of the system of FIG. 2.

FIGS. 8-10 illustrate an exemplary user interface usable with the IM system of FIG. 2. FIG. 8 shows an options interface 800, which allows the user to sign in to the system. Specifically, the options interface 800 includes a text-based sign in portion 802, which allows the user to enter general criteria, such as automatically running, opening, or showing Windows Live™ Messenger, allow automatic sign in when connected to the internet, and use the same display picture and personal message. The text-based sign in portion 802 is shown as a structured sign in form, but could additionally or alternatively include one or more freeform sign in fields. The text-based sign in portion 802 is provided for its ease and effectiveness at automatically running or signing the user to Windows Live™ Messenger with the same display picture and personal message once the user 102 signs in.

Since at least some users 102 have clear preferences for multiple communication device features, the options interface 800 also includes a sign in at more than one place portion 804. This allows the user 102 to sign in while maintaining control and privacy of the communication. The text-based sign in portion 802 and 804 are provided for its ease and effectiveness at accurately recognizing signing in at more than one place, putting messages on hold, signing out and renaming this place, which is readily recorded in the data. For example, the user 102 has chosen "Keep me signed in here, but don't show my messages (put messages on hold)" option. Based on the text to the sign in interface 802 and sign in at more than one place 804, the system 200 signs in the user 102. The options interface 800 includes, a text-based rename place portion 806, illustrating how the user 102 may rename this place, such as the log in location or the communication device.

In an exemplary implementation, the user 102 may sign in or log on from a first endpoint on the communication device to the application program 106 on the server 110(a). The user 102 may sign in or log on with another communication device to the first endpoint. Thus, the other endpoints may connect to the first endpoint, rather than connecting directly to the server 110(a).

In another exemplary implementation, all the endpoints in a corporation can connect to the server 110(a) through a smaller number of endpoints within the corporation. Thus, connecting the endpoints this way has no direct effect regarding the user 102.

FIG. 9 shows a privacy interface 900, which allows the user 102 to determine messages are shown or on hold on the system 200. Specifically, the privacy interface 900 includes a text-based portion 902, which shows the user 102 the messages are on hold. Thus, the user 102 may decide to resume or go for other options. The privacy interface 900 also includes a text-based portion 904 that illustrates the messages are not shown because the user 102 is signed in at another place. The user may select resume, sign out, or get help.

Furthermore, the privacy interface 900 includes a text-based portion 906 to illustrate the messages have been placed on hold. Thus, the user 102 may prevent another individual from viewing messages on another alive communication device by not showing the messages or by holding these messages. Also, the user 102 may prevent sending annoying sound notifications and hiding popup to the non-active communication device (used by the other individual).

FIG. 10 illustrates an IM options interface 1000, which allows the user 102 to relate presence information, profile information, privacy, and signing out on the system 200. Interface 1002 illustrates a display picture and a friendly name. In particular, the options interface 1000 includes a presence portion 1004, which allows the user 102 to indicate presence as online, busy, be right back, away, in a call, out to lunch or appear offline. The options interface 1000 also includes profile information 1006, such as changing display picture, changing signature sound, and changing display name. Furthermore, there is an interface section 1008 where the user 102 may decide to put messages on hold or sign out from here. There are additional sign out such as signing out from here, from school, and from everywhere, as shown at interface 1010.

In an exemplary implementation, the user 102 may log off from one endpoint without affecting the other endpoints. For example, the user 102 may sign out from home while keeping the connections alive at school and at work. Thus, the user experience is beneficial, satisfying, and efficient with the multiple simultaneous connections on the IM program.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

The invention claimed is:

1. A method for multiple simultaneous connections on an instant messaging program, implemented at least in part by a communication device, the method comprising:
    establishing multiple simultaneous connections for communication transmitted to or received from communication devices associated with a user implemented on an instant messaging program, wherein the communication devices comprise mobile communication devices and non-mobile communication devices;
    issuing notifications to the communication devices:
    hiding windows and sounds associated with receiving instant messages and notifications on communication devices that are not actively participating in the communication;
    when a response from the mobile communication device is received, the communication is transmitted to or received from the mobile communication device that is in an active mode;
    mirroring the communication transmitted to or received from the mobile communication device that is in the active mode to the other non-mobile communication devices;
    when a response from a first communication device is not received, the communication to be transmitted to the first communication device is put on hold, such that the communication is not to be transmitted to the first communication device;
    when a response from a second communication device is received, the communication is transmitted to or received from the second communication device that is in an active mode;
    indicating presence on the communication devices with multiple points of presence, wherein the communication devices are in synchronization with each other;
    monitoring connections of the communication devices to the instant messaging program; and
    disconnecting one of the communication devices from the instant messaging program remotely.

2. The method of claim 1, wherein the mirroring communication comprises receiving notifications, transmitting and receiving instant messages, changing presence information, changing contact list, changing group information, and opening and closing a conversation on an active device is mirrored on the other communication devices.

3. The method of claim 1, further comprising keeping the multiple simultaneous connections alive or open to receive communication or notifications.

4. The method of claim 1, further comprising switching communication from the first communication device to the second communication device of the communication devices, as the connections are kept alive.

5. The method of claim 1, further comprising sending a notification of a list of the communication devices connected to the instant messaging program.

6. The method of claim 1, further comprising establishing a connection to an instant messaging program or service implemented on a web browser.

7. The method of claim 1, further comprising retrieving a history of the communication transmitted to or received on the communication devices.

8. A computer-readable storage device comprising computer-executable instructions that, when executed on a processor, perform the method as recited in claim 1.

9. A system for establishing multiple simultaneous connections on an instant messaging program, implemented by computer-executable instructions comprising:
    a memory;
    a processor coupled to the memory for establishing multiple simultaneous connections;
    the processor is configured to:
    establish multiple simultaneous connections for communication devices associated with a user to an instant messaging program, wherein the connections indicate presence on the communication devices with multiple points of presence;
    issue notifications to the communication devices:
    hide windows and sounds associated with receiving instant messages and notifications on the communication devices that are not actively participating in the communication;
    when a response from a first communication device that is a mobile communication device is received, communication is further transmitted to or received from the first communication device that is in an active mode;
    wherein the communication is mirrored on non-mobile communication devices that are connected to the instant messaging program;
    when a response from a first communication device is not received, the communication that is to be transmitted to the first communication is put on hold in which the communication is not to be transmitted to the first communication device;

when a response from a second communication device is received, the communication is transmitted to or received from the second communication device that is considered to be in an active mode; and synchronize information between the communication devices logged on the instant messaging program.

10. The system of claim 9, further comprising a user interface module configured to issue a notification of a list of the communication devices that are connected to the instant messaging program.

11. The system of claim 9, further comprising a user interface module configured to enable logging on or off from one communication device without logging off the other communication devices.

12. The system of claim 9, further comprising an endpoint management module configured to maintain the simultaneous connections by keeping the connections alive for communication or notifications transmitted to or received from the communication devices; the endpoint management module further configured to keep the connections alive to enable switching communication on the first communication device to the second communication device.

13. The system of claim 9, further comprising the processor configured to retrieve information transmitted initially to the communication devices.

14. The system of claim 9, further comprising the processor configured to encrypt the communication and information transmitted to or received on the instant messaging program.

15. A computer-readable storage device comprising computer-executable instructions that, when executed on a processor, perform the methods as recited in the system of claim 9.

16. A messenger server configured to mirror communication transmitted to or received from communication devices, the messenger server comprising:
a memory;
the messenger server coupled to the memory which includes an instant messaging program; wherein the messenger server is configured to:
issue notifications to communication devices;
hide windows and sounds associated with receiving instant messages and notifications on the communication devices that are not actively participating in the communication;
when a response from a mobile communication device is received, transmit to and receive communication from the mobile communication device;
mirror the communication transmitted to or received from the mobile communication device to other non-mobile communication devices;
when a response from the first communication device is not received, the communication that is to be transmitted to the first communication is put on hold in which the communication is not to be transmitted to the first communication device;
when a response from a second communication device is received, the communication is transmitted to or received from the second communication device that is in an active mode;
indicate presence on the one or more devices with multiple points of presence, wherein presence enables synchronization of the communication devices; and
maintain the simultaneous connections by keeping the connections alive or open, wherein the alive or open connection enables switching from a first communication device to a second communication device to continue the communication.

17. The messenger server of claim 16, further comprising signing in or signing off from one communication device will not affect the status of the other communication devices.

18. The messenger server of claim 16, further comprising closing communication on one communication device will close communication on the communication devices logged in to the instant messaging program.

* * * * *